United States Patent [19]

Udagawa et al.

[11] Patent Number: 4,731,662
[45] Date of Patent: Mar. 15, 1988

[54] IMAGE PROCESSING METHOD FOR PROCESSING AN IMAGE SIGNAL DIFFERENTLY DEPENDING ON THE RANGE OF AN IMAGE CHARACTERISTIC THEREOF RELATIVE TO THE RANGE WITHIN WHICH AN OUTPUT DEVICE CAN REPRODUCE THE IMAGE CHARACTERISTIC

[75] Inventors: Yoshiro Udagawa; Takashi Sasaki, both of Tokyo, Japan

[73] Assignee: Canon Kabushiki Kaisha, Tokyo, Japan

[21] Appl. No.: 838,785

[22] Filed: Mar. 12, 1986

[30] Foreign Application Priority Data

Mar. 21, 1985 [JP] Japan .................................. 60-56630
Mar. 21, 1985 [JP] Japan .................................. 60-56631

[51] Int. Cl.$^4$ ....................... H04N 1/46; H04N 1/40; G03F 3/08
[52] U.S. Cl. ........................ 358/75; 358/80; 358/280; 358/284
[58] Field of Search ............ 358/75, 75 IJ, 78, 80, 358/284, 280, 282, 296

[56] References Cited

U.S. PATENT DOCUMENTS

| | | | |
|---|---|---|---|
| 4,305,094 | 12/1981 | Yamada | 358/80 |
| 4,371,260 | 2/1983 | Yoshimoto et al. | 358/75 |
| 4,394,089 | 7/1983 | McIntosh et al. | 358/75 |
| 4,396,940 | 8/1983 | Tanaka et al. | 358/80 |
| 4,402,015 | 8/1983 | Yamada | 358/80 |
| 4,410,909 | 10/1983 | Ueda et al. | 358/75 |
| 4,467,364 | 8/1984 | Konagaya | 358/80 |
| 4,472,736 | 9/1984 | Ushio et al. | 358/75 |
| 4,591,904 | 5/1986 | Urabe et al. | 358/75 |
| 4,667,228 | 5/1987 | Kawamura et al. | 358/80 |
| 4,670,780 | 6/1987 | McManus et al. | 358/80 |
| 4,679,074 | 7/1987 | Sugiura et al. | 358/80 |

FOREIGN PATENT DOCUMENTS

| | | | |
|---|---|---|---|
| 51742 | 5/1981 | Japan | 358/80 |
| 37878 | 2/1985 | Japan | 358/75 |
| 105375 | 6/1985 | Japan | 358/75 |
| 7772 | 1/1986 | Japan | 358/280 |

OTHER PUBLICATIONS

Wong, K. Y., "Adaptive Contrast Ranging for Images", IBM Technical Disclosure Bulletin, vol. 18, No. 3, Aug. 1975, pp. 914–917.

Primary Examiner—James J. Groody
Assistant Examiner—Randall S. Svihla
Attorney, Agent, or Firm—Fitzpatrick, Cella, Harper & Scinto

[57] ABSTRACT

The present disclosure relates to a method of processing an image signal in which one image characteristic, such as luminance density or color saturation, may have a range incapable of reproduction by an output device due to limitations inherent in such device. In the disclosed method the range of the image characteristic for one image frame is detected and compared to the range that the output device can reproduce. Depending on the result of the comparison, the input image signal is processed differently; for example, the image signal may be converted so that the range of the image characteristic is shifted or compressed, or it may not be converted at all.

28 Claims, 10 Drawing Figures

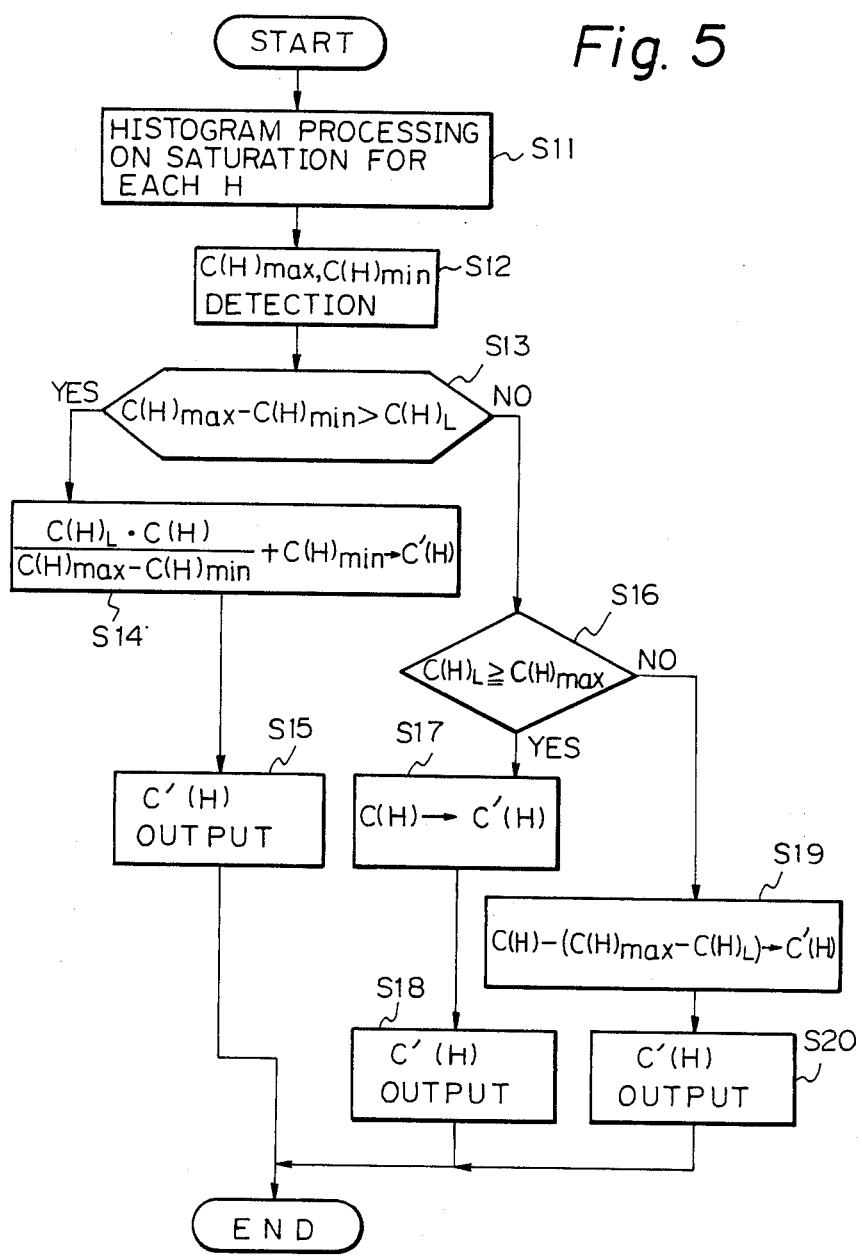

IMAGE PROCESSING METHOD FOR PROCESSING AN IMAGE SIGNAL DIFFERENTLY DEPENDING ON THE RANGE OF AN IMAGE CHARACTERISTIC THEREOF RELATIVE TO THE RANGE WITHIN WHICH AN OUTPUT DEVICE CAN REPRODUCE THE IMAGE CHARACTERISTIC

BACKGROUND OF THE INVENTION

1. Field of the Invention

The present invention relates to an input image signal processing method particularly useful for the case where the reproduction range of an output device is not sufficient for obtaining a complete reproduction of the image characteristics of an input image signal.

2. Related Background Art

The gradation range of a television signal, for example, is in general considerably wide. Conventionally, a gradation correction has been performed to obtain a hard copy with a printer when the gradation reproducing range of the printer is narrower than the gradation range of a television signal. In one example of the related art gradation correction methods, a histogram is formed in which an input image signal is represented by classifying it in accordance with its gradation level. Based upon the histogram, the maximum gradation level of the input image signal is made to coincide with that of a printer, and the minimum gradation level of the input image signal is made to coincide with that of the printer. With this method, it has been possible to always obtain a high contrast image. However, it involves some problems that even a flat image which inherently has no contrast is reproduced with contrast and an image of dark gradation is reproduced as a completely dark portion.

In the case where an input signal is a color image signal, to make the saturation range of an input color image signal agree with the saturation reproducing range of an output device such as a printer, the portion of an input color image signal exceeding the saturation reproducing range has been heretofore compressed to the maximum value of the reproducing range. As a result, saturation continuity of the input color image is destroyed, resulting in a deformed output image.

SUMMARY OF THE INVENTION

It is an object of the present invention to provide an image processing method capable of eliminating the above-described related art disadvantages and obtaining a reproduced image with high quality.

It is another object of the present invention to provide an image processing method for reproducing the image characteristic of an input image signal as faithfully as possible in the case where the input range of the input image characteristic is broader than the reproduction range of an output device.

It is further object of the present invention to provide an image processing method capable of reproducing an image having a similar gradation characteristic of the input image signal.

It is a still further object of the present invention to provide a color image processing method capable of color-processing most suitably for the saturation distribution of an input color image.

The above and other objects of the present invention will become apparent from the following detailed description and the accompanying drawings.

BRIEF DESCRIPTION OF THE DRAWINGS

FIG. 5 is a flow chart showing the processes performed by CPU 113 of FIG. 4.

PREFERRED EMBODIMENTS

(First Embodiment)

The present invention will now be described in connection with a first embodiment wherein a television signal is recorded with a monochrome image printer.

Figure 1:
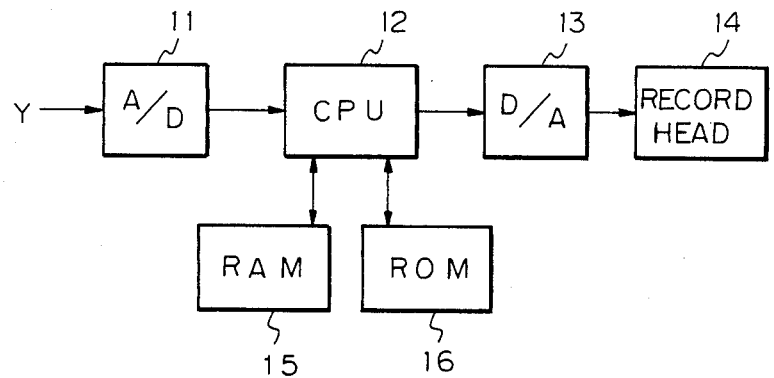
FIG. 1 is a block diagram of a monochrome printer applied to a first embodiment of the image processing method according to the present invention.

FIG. 1 is a block diagram showing a monochrome image printer applied to the first embodiment of the image processing method according to the present invention. In the figure, Y represents a luminance signal of an input television signal, reference numeral 11 represents an analog/digital (A/D) converter, and 12 represents CPU for controlling a histogram process and gradation correction process. 13 represents a digital-/analog (D/A) converter, 14 represents a record head capable of recording a gradated image, 15 represents a RAM for storing histogram data and values necessary for the processes by CPU 12, and 16 represents a ROM storing a process program of CPU 12.

Figure 2:
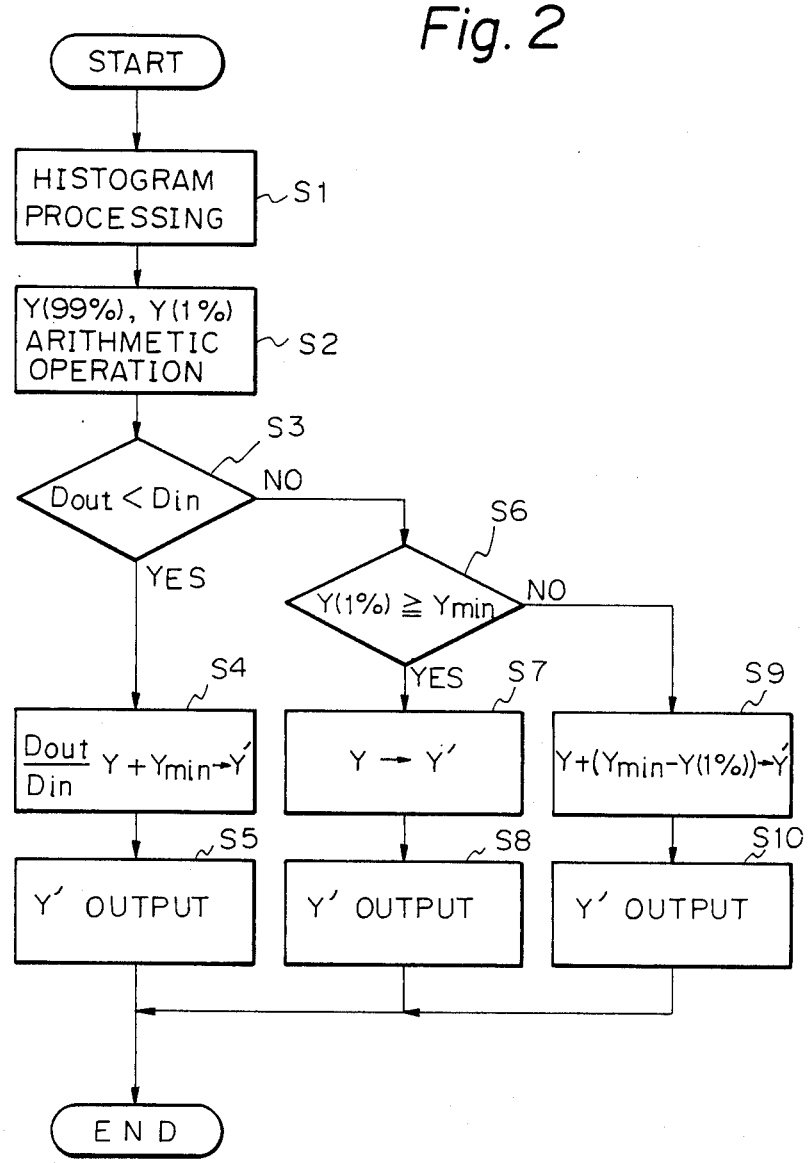
FIG. 2 is a flow chart showing the processes by CPU 12 of FIG. 1.

The operation will now be described by referring to a flow chart of FIG. 2.

At step S1, a histogram of an input luminance signal Y is formed, i.e., a distribution of pixels constituting a one image frame is formed for each luminance level. At step S2, a dark or shadow point Y (1%) is set at the luminance level brighter by 1% from the minimum luminance level of all pixels, while a highlight point Y (99%) is set at the luminance level brighter by 99% from the minimum liminance level of all pixels. The more detailed description of steps S1 and S2 is disclosed in U.S. patent application Ser. No. 659,948 filed on Oct. 11, 1984, now U.S. Pat. No. 4,667,228, and assigned to the assignee of the present application.

Figure 3A:
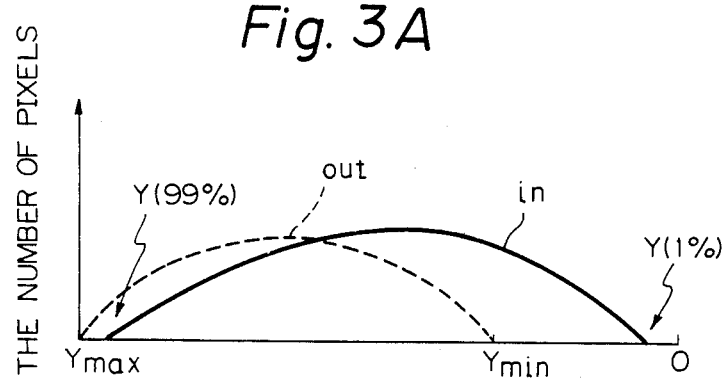
FIGS. 3A to 3C are graphs showing input and output histograms.

At step S3, a reproducing range Dout of the printer and the gradation range Din=Y (99%)−Y (1%) of the input image signal are compared with each other, Dout being a difference between the maximum reproducing luminance Y max of the printer and the minimum reproducing luminance Y min thereof. If Dout<Din at step S3, i.e., if the formed histogram is as shown in FIG. 3A, the reproducing gradation range of the printer is narrower than the gradation range of the input image signal so that the gradation correction is performed at step S4 in accordance with the following formula.

$$\frac{Dout}{Din} Y + Y\min \rightarrow Y$$

Thus, it is possible to perform a gradation correction with a high contrast preserved in conformity with the original contrasted input image.

Figure 3B:
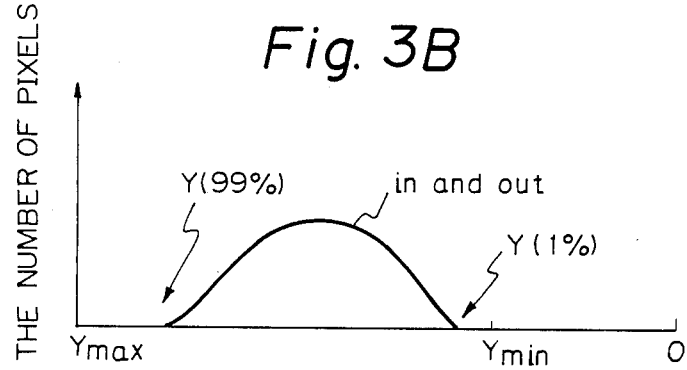

In case Dout≧Din at step S3 and it is judged at step S6 that Y (1%)≧Y min, it means that as shown in FIG. 3B the histogram distribution of the input image signal is within the reproducing gradation range of the printer. Therefore, without performing a gradation correction, the input luminance signal Y is directly output as an output signal Y' at step S7.

As above, the input image signal whose histogram distribution is within the gradation limit range of the printer is not subjected to a gradation correction, and recorded without changing its signal characteristic.

Figure 3C:
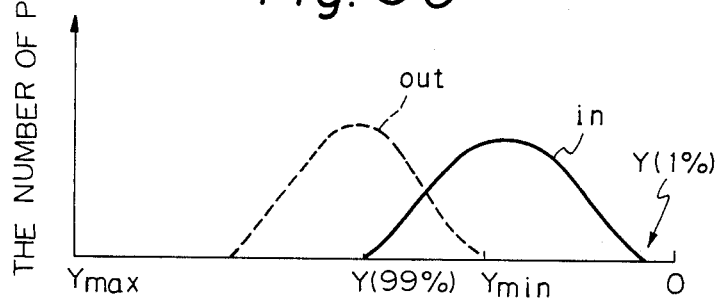

If Din≧Dout and Y (1%)<Y min at steps S3 and S6, i.e., if the input and output histograms are represented as shown in FIG. 3C, a gradation correction is performed in accordance with the following formula while preserving the gradation range of the input image signal.

$$Y+(Y\ min-Y(1\%))\rightarrow Y'$$

Thus, it is possible to reproduce the input image of a dark gradation while preserving the same contrast and the same dark gradation.

The signal Y' which is obtained at steps S4, S7 and S9 is output at steps S5, S8 and S10, respectively.

In FIG. 3, in indicates the input image signal histogram, while out indicates the output image signal histogram.

The above embodiment has been directed to a monochrome image. However, in the case of a color image, an RGB signal is subjected to the processing similar to the above, if a luminance signal and color-difference signals are to be used, the luminance signal is subjected to the similar processing. Instead of a printer used as an output device hereinabove, a display unit with a relatively narrow reproducing gradation range may also be used. Furthermore, instead of Y (1%) and Y (99%) in the histogram, other setting values including Y (0%) and Y (100%) may be used.

(Second Embodiment)

A second embodiment of the image processing method of the invention will be described which is applied to a color printer capable of obtaining a hard copy of input R, G and B color signals.

Figure 4:
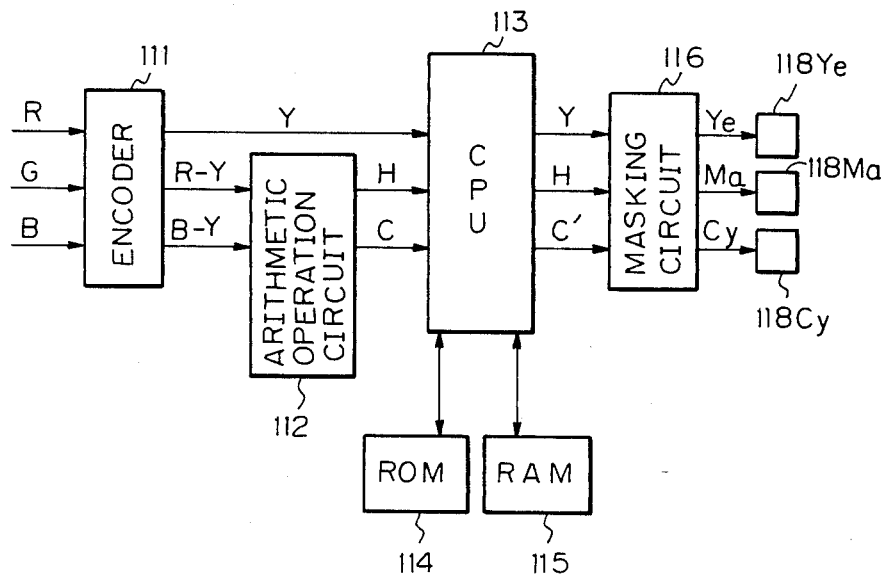
FIG. 4 is a block diagram of a color printer applied to a second embodiment of the image processing method according to the present invention.

FIG. 4 is a block diagram of the color printer applied to the second embodiment, specifically showing how the signals are processed. In the figure, reference numeral 111 represents an encoder for obtaining a luminance signal Y and color-difference signals (R−Y) and (B−Y) from the input R, G and B signals in accordance with the following equations.

$$Y=0.3R+0.59G+0.11B$$

$$R-Y=R-Y$$

$$B-Y=B-Y$$

Reference numeral 112 represents an arithmetic operation circuit for obtaining a hue signal H and saturation signal C based on the color-difference signals (R−Y) and (B−Y) and in accordance with following equations.

$$H = \tan\frac{B-Y}{R-Y}$$

$$C = \sqrt{(B-Y)^2 + (R-Y)^2}$$

Reference numeral 113 represents a CPU which performs a saturation histogram forming process and a saturation conversion process, respectively for each hue signal. Reference numeral 114 represents a ROM storing a process program for the CPU, 115 represents a RAM for storing histogram data and values necessary for the process by CPU 113. Reference numeral 116 represents a masking circuit for performing a masking process based on the luminance signal Y, hue signal H and converted saturation signal C' to obtain primary color signals of yellow Ye, magenta Ma and cyan Cy. 118 Ye, 118 Ma and 118 Cy represent record heads for recording respective primary colors.

The process operation of CPU 113 will now be described with reference to a flow chart of FIG. 5.

At step S11, a saturation histogram of an input color signal is formed by forming a distribution of pixels constituting an image frame for each hue signal H; in other words, the saturation distribution is checked with respect to each of a plurality of predetermined hues. Next, at step S12 the maximum saturation C(H)max and the minimum saturation C(H)min are detected for each hue signal H. At step S13, the difference between C(H)max and C(H)min and the maximum reproducing saturation $C(H)_L$ measured beforehand of the color printer for each hue signal H, are compared with each other. If C(H)max−C(H)min>$C(H)_L$ at step S13, then step S14 follows to perform a saturation compression process and obtain an output saturation C'(H) in accordance with the following formula.

$$\frac{C(H)_L \cdot C(H)}{C(H)\text{max} - C(H)\text{min}} + C(H)\text{min} \rightarrow C'(H)$$

Figure 6A:
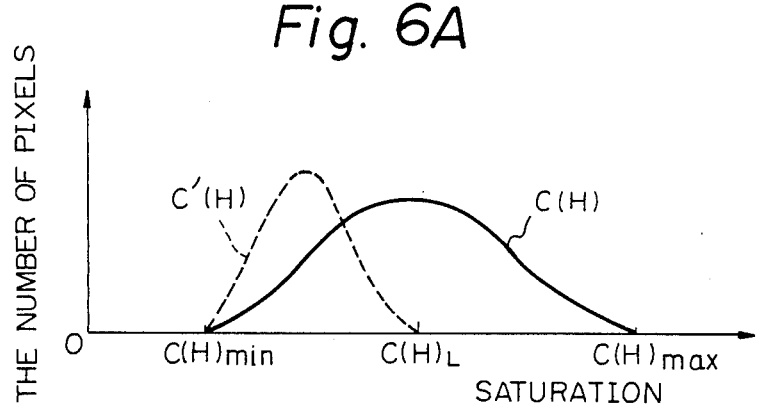
FIGS. 6A to 6C are graphs showing input and output histograms regarding saturation.

As above, the saturation compression process as shown in FIG. 6A is carried out. Thus, it is possible to conduct saturation compression without destroying chromaticity continuity.

Figure 6B:
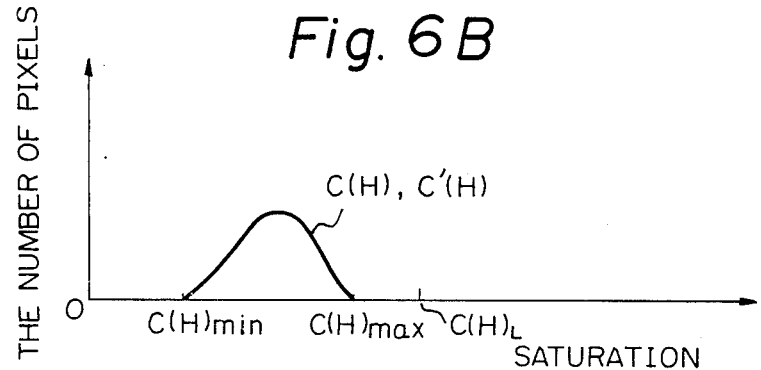

If it is judged that at step S13 C(H)max−C(H)min≦$C(H)_L$ and at step S16 $C(H)_L$≧C(H)max, it means that as shown in FIG. 6B the saturation range of the input image is fully within the reproducing saturation range of the printer. Therefore, C(H) is directly output as C'(H) at step S17 without performing a saturation conversion. Thus, it is possible to reproduce the input image characteristics without any change.

Figure 6C:
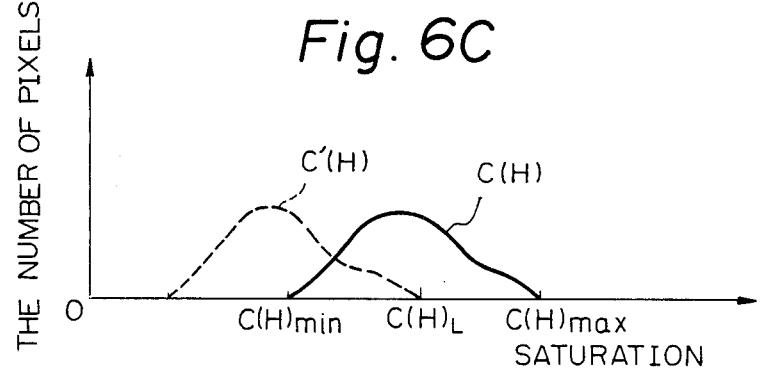

If it is judged that at step S13 C(H)max−C(H)min≦$C(H)_L$ and at step S16 $C(H)_L$<C(H)max, it means that as shown in FIG. 6C the maximum saturation of the input image exceeds the maximum value of the reproducing saturation range. In this case wherein the saturation is shifted to a higher range, the distribution histogram as a whole is shifted at step S19 in accordance with the following formula.

$$C(H)-(C(H)\text{max}-C(H)_L)\rightarrow C'(H)$$

With this process, it is possible to reproduce the saturation shift of the output image and give a natural, visual impression due to the unchanged absolute value of the saturation range.

C'(H) signals obtained at steps S14, S17 and S19 are respectively output at steps S15, S18 and S20.

In the above embodiment, the saturation conversion has been effected for each hue signal. However, a saturation conversion for both hue and luminance signals may be processed which results in a more precise but complicated conversion.

Instead of a luminance signal Y, hue signal H and saturation signal C, similar signals may be used such as Lab*, Luv* and else.

In the above embodiment, although the conversion has been directed to all of the hue signals a specific hue signal or signals may be used instead.

As seen from the foregoing description of the present invention, it is possible to realize a very natural image reproduction while preserving the characteristics of an input image signal.

Furthermore, in the application of the present invention to a color image processing it is possible to produce a color image while preserving the characteristic of an input color image signal, which is particularly useful for color printers or for color display units having a limited reproducing saturation range.

The present invention is not intended to be limited to the above embodiments, but various applications and modifications are possible without departing from the scope of the claims.

What we claim is:

1. An image processing method applicable when an output device for reproducing an image represented by an input image signal having image characteristics cannot fully reproduce the range of one of the image characteristics of said input image signal, comprising the steps of:
    detecting an input range of said one image characteristic of said input image signal corresponding to one image frame, and comparing said input range with an output range representing the range of said one image characteristic which can be reproduced by said output device;
    judging whether or not said input range is within said output range; and
    performing respectively different processings on said input image signal when said input range is within said output range and when said input range is not within said output range.

2. An image processing method according to claim 1, wherein said one image characteristic is a gradation characteristic representative of the density range of a luminance signal.

3. An image processing method according to claim 1, wherein said one image characteristic is a saturation characteristic representative of the saturation range of a color image signal.

4. An image processing method according to claim 1, wherein in said detecting step values of a predetermined highlight point and a predetermined shadow point of said input image signal corresponding to said one image frame are detected.

5. An image processing method according to claim 4, wherein in said detecting step a histogram is formed for said one image characteristic to enable said values of said predetermined highlight and shadow points to be detected.

6. An image processing method according to claim 1, wherein if said input range is judged not to be within said output range, in said performing step conversion of said input range of said one image characteristic to be within said output range is performed, whereas if said input range is judged to be within said output range, said conversion of said input range of said one image characteristic is not performed.

7. An image processing method according to claim 1, wherein if said input range is judged not to be within said output range and if said input range is narrower than said output range, said input range of said one image characteristic is shifted to be within said output range.

8. An image processing method according to claim 7, wherein said shift is carried out using as a reference a limit of said output range.

9. An image processing method according to claim 1, wherein if said input range is judged not to be within said output range and if said input range is broader than said output range, said input range of said one image characteristic is compressed to be within said output range.

10. An image processing method according to claim 9, wherein said compression is carried out using as references both limits of said output range.

11. An image processing method applicable when a density range of an input image signal is broader than a density range within which an output device can reproduce an image represented by said input image signal, comprising the steps of:
    detecting an input density range of said input image signal corresponding to one image frame, and comparing said input density range with an output density range representing the density range which can be reproduced by said output device;
    judging whether or not said input density range is within said output density range; and
    performing respectively different processings on said input image signal when said input density range is within said output density range and when said input density range is not within said output density range.

12. An image processing method according to claim 11, wherein in said detecting step the maxiumum and minimum density values of said input image signal corresponding to said one image frame are detected.

13. An image processing method according to claim 12, wherein in said detecting step a density histogram is formed for said input image signal to enable said maximum and minimum density values to be detected.

14. An image processing method according to claim 11, wherein one of said processings inlcudes conversion of said input density range to be within said output density range, and wherein if said input density range is judged to be within said output density range, in said performing step said conversion is not performed.

15. An image processing method according to claim 11, wherein if said input density range is judged not to be within said output density range, conversion of said input density range is performed to make said input density range to be within said output density range.

16. An image processing method according to claim 15, wherein if said input density range is judged not to be within said output density range and if said input density range is narrower than said output density range, said input density range is shifted to be within said output density range.

17. An image processing method according to claim 16, wherein said shift is carried out using as a reference a limit of said output density range.

18. An image processing method according to claim 15, wherein if said input density range is judged not to be within said output density range and if said input density range is broader than said output density range, said input density range is compressed to be within said output density range.

19. An image processing method according to claim 18, wherein said compression is carried out using as references both limits of said output density range.

20. A color image processing method applicable when a saturation range of an input color image signal is broader than a saturation range within which a color output device can reproduce an image represented by said input color image signal, comprising the steps of:

detecting an input saturation range of said input color image signal corresponding to one image frame;

comparing said input saturation range with an output saturation range representing the saturation range which can be reproduced by said color output device;

judging whether or not said input saturation range is within said output saturation range; and performing respectively different processings on said input color image signal when said input saturation range is within said output saturation range and when said input saturation range is not within said output saturation range.

21. A color image processing method according to claim 20, wherein in said detecting step the maximum and minimum saturation values of said input color image signal corresponding to said one image frame are detected.

22. A color image processing method according to claim 21, wherein in said detecting step a saturation histogram is formed for said input color image signal to enable said maximum and minimum values to be detected.

23. A color image processing method according to claim 20, wherein one of said processings includes conversion of said input saturation range to be within said output saturation range, and wherein if said input saturation range is judged to be within said output saturation range, in said performing step said conversion is not performed.

24. A color image processing method according to claim 20, wherein if said input saturation range is judged not to be within said output saturation range, conversion of said input saturation range is performed to make said input saturation range to be within said output saturation range.

25. A color image processing method according to claim 24, wherein if said input saturation range is judged not to be within said input saturation range and if said input saturation range is narrower than said output saturation range, said input saturation range is shifted to be within said output saturation range.

26. A color image processing method according to claim 25, wherein said shift is carried out using as a reference a limit of said output saturation range.

27. A color image processing method according to claim 24, wherein if said input saturation range is judged not be within said output saturation range and if said input saturation range is broader than said output saturation range, said input saturation range is compressed to be within said output saturation range.

28. A color image processing method according to claim 27, wherein said compression is carried out using as references both limits of said output saturation range.

* * * * *

UNITED STATES PATENT AND TRADEMARK OFFICE
CERTIFICATE OF CORRECTION

PATENT NO. : 4,731,662
DATED : March 15, 1988
INVENTOR(S) : YOSHIRO UDAGAWA, ET AL.

It is certified that error appears in the above-identified patent and that said Letters Patent is hereby corrected as shown below:

COLUMN 1

Line 60, "further" should read --a further--.

COLUMN 5

Line 10, "else." should read --others.--.

COLUMN 8

Line 18, "input" should read --output--.

Signed and Sealed this

Seventeenth Day of January, 1989

Attest:

DONALD J. QUIGG

Attesting Officer

Commissioner of Patents and Trademarks